(12) United States Patent
Johnson

(10) Patent No.: US 11,570,975 B2
(45) Date of Patent: Feb. 7, 2023

(54) FISHING AID DEVICE

(71) Applicant: Bryan Johnson, Becker, MN (US)

(72) Inventor: Bryan Johnson, Becker, MN (US)

( * ) Notice: Subject to any disclaimer, the term of this patent is extended or adjusted under 35 U.S.C. 154(b) by 268 days.

(21) Appl. No.: 16/397,654

(22) Filed: Apr. 29, 2019

(65) Prior Publication Data

US 2020/0337285 A1    Oct. 29, 2020

(51) Int. Cl.
*A01K 87/00* (2006.01)
*A01K 87/04* (2006.01)
*A01K 85/01* (2006.01)

(52) U.S. Cl.
CPC ............ *A01K 87/007* (2013.01); *A01K 87/04* (2013.01); *A01K 85/01* (2013.01)

(58) Field of Classification Search
CPC ....... A01K 87/007; A01K 87/04; A01K 85/01
USPC ............................................................ 43/17
See application file for complete search history.

(56) References Cited

U.S. PATENT DOCUMENTS

| | | | | |
|---|---|---|---|---|
| 3,656,251 A * | 4/1972 | Snider | .................... | A01K 93/02 43/17 |
| 3,913,256 A * | 10/1975 | Morris | .................... | A01K 93/02 43/17.5 |
| 4,109,404 A * | 8/1978 | Preeschl | ................ | A01K 93/02 43/17 |
| 4,809,456 A * | 3/1989 | Caparelli, Jr. | ......... | A01K 93/02 43/17 |
| 5,119,578 A * | 6/1992 | Johnson | ................. | A01K 93/02 43/17 |
| 5,157,857 A * | 10/1992 | Livingston | ............. | A01K 85/01 43/17 |
| 5,697,182 A * | 12/1997 | Rodgers | .................. | B63C 11/02 43/17.1 |
| 5,738,433 A | 4/1998 | Sparks | | |
| 5,867,931 A * | 2/1999 | Morris | ................. | A01K 97/125 43/17 |
| 5,915,941 A | 6/1999 | Casey | | |
| 6,098,331 A * | 8/2000 | Kim | ....................... | A01K 85/01 43/17.6 |
| 6,796,077 B1 * | 9/2004 | Dupree | .................. | A01K 85/01 43/17.6 |
| 7,032,343 B1 * | 4/2006 | Foss | ....................... | A01K 97/01 43/17 |
| 7,111,425 B1 | 9/2006 | Cormier | | |
| 7,225,580 B1 | 6/2007 | Chou | | |
| 7,263,797 B1 | 9/2007 | Trillo | | |
| 7,562,489 B2 * | 7/2009 | Turner | ................... | A01K 85/01 43/17.6 |
| 8,161,678 B1 * | 4/2012 | DeLucca | ................ | A01K 93/02 43/17 |

* cited by examiner

*Primary Examiner* — Brady W Frazier
*Assistant Examiner* — Madison Elizabeth Dittner
(74) *Attorney, Agent, or Firm* — Johnson and Phung LLC; Thomas N. Phung

(57) ABSTRACT

A fishing aid device that is a miniature size and doesn't need a battery. The fishing aid device includes a housing; a fishing aid member disposed in the housing; and an actuating assembly disposed in the housing for energizing the fishing aid member.

3 Claims, 2 Drawing Sheets

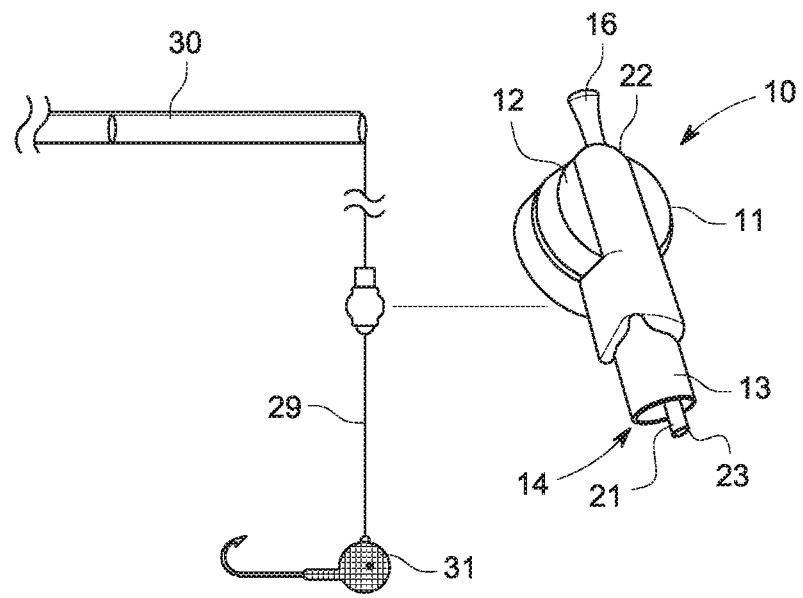
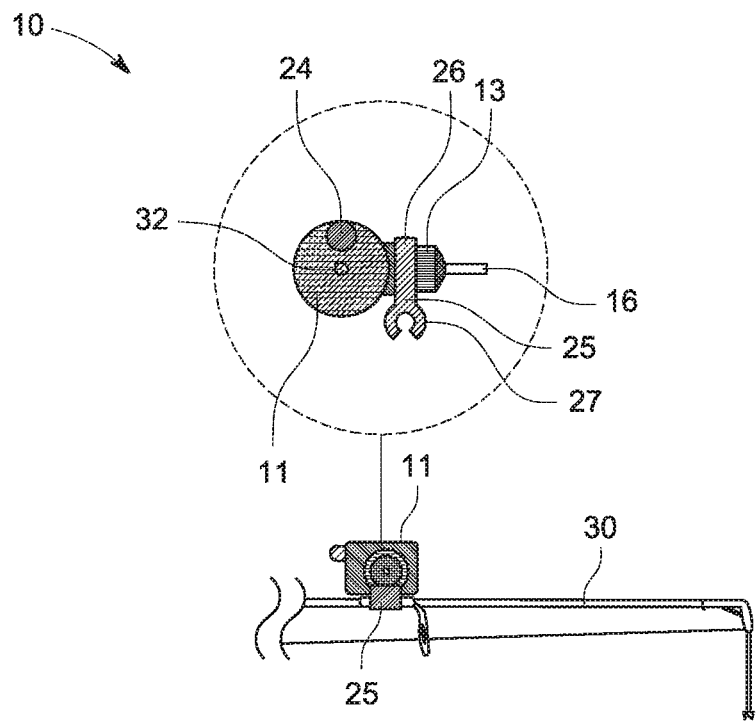
FIG. 3
FIG. 4

FISHING AID DEVICE

FIELD OF THE INVENTION

The present invention relates to fishing supports and more particularly pertains to a new fishing aid device that is a miniature size and doesn't need a battery.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of fishing supports is known in the prior art. More specifically, fishing supports heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a blinking LED protectively encapsulated within the bobber body and laterally offset from the central axis. A light pipe extends from the offset LED to the top of the bobber and terminates in a lens on the vertical central axis. The LED is energized by an improved capacitive energy storage circuit within the bobber, and the circuit significantly increases operating time between recharging of the circuit. No batteries are carried by the bobber. Another prior art includes a housing having a casing extended into a receptacle, a circuit board is disposed in the housing, a processor device and one or more light members are attached onto the circuit board, one or more batteries are electrically coupled to the circuit board. Also, another prior art includes a fishing rod accessory including a cylindrical coupling that has axially opposed end portions, a bore formed in fluid communication with the end portions, and a stop member positioned therein and extending along an interior surface of the coupling. While these devices fulfill their respective, particular objectives and requirements, the aforementioned patents do not disclose a new fishing aid device.

SUMMARY OF THE INVENTION

The general purpose of the present invention, which will be described subsequently in greater detail, is to provide a new fishing aid device which has many of the advantages of the fishing supports mentioned heretofore and many novel features that result in a new fishing aid device which is not anticipated, rendered obvious, suggested, or even implied by any of the prior art fishing supports, either alone or in any combination thereof. None of the prior art includes the combination of the elements of the present invention.

There has thus been outlined, rather broadly, the more important features of the fishing aid device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new fishing aid device which has many of the advantages of the fishing supports mentioned heretofore and many novel features that result in a new fishing aid device which is not anticipated, rendered obvious, suggested, or even implied by any of the prior art fishing supports, either alone or in any combination thereof.

Still another object of the present invention is to provide a new fishing aid device that is a miniature size and doesn't need a battery.

Still yet another object of the present invention is to provide a new fishing aid device with the capability of being illuminated upon a fish strike.

Even still another object of the present invention is to provide a new fishing aid device that is lightweight.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes references to the annexed drawings wherein:

FIG. 3 are first perspective views of a new fishing aid device according to the present invention.

FIG. 4 are second perspective views of the present invention.

DETAILED DESCRIPTION OF THE INVENTION

Figure 1:
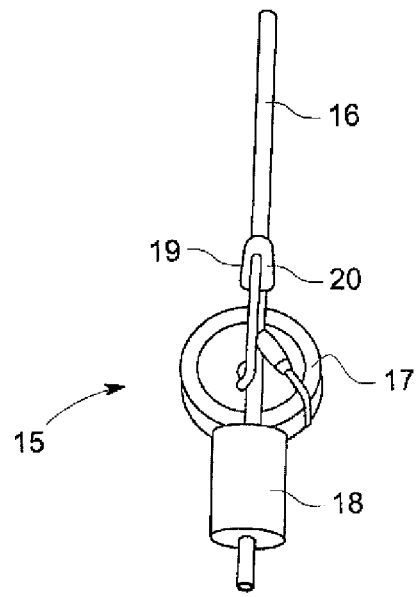
FIG. 1 are first perspective views of a new fishing aid device according to the present invention.
Figure 2:
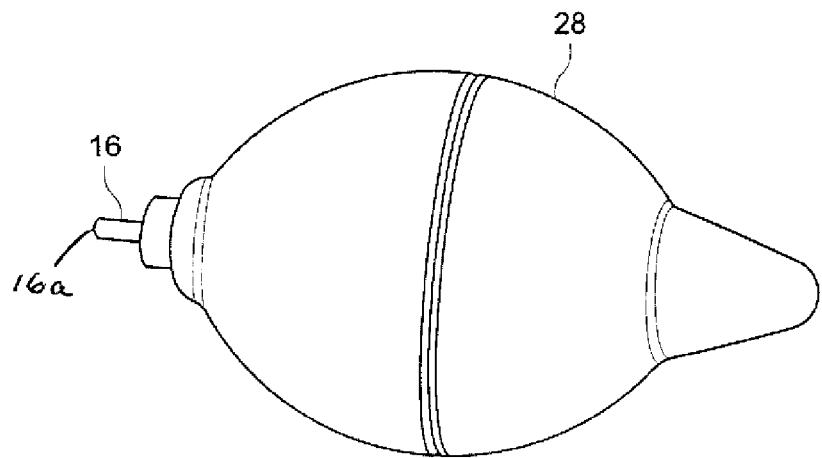
FIG. 2 are second perspective views of the present invention.

With reference now to the drawings, and in particular to FIGS. 1 through 4 thereof, a new fishing aid device embodying the principles and concepts of the present invention and generally designated by the reference numeral 10 will be described.

As best illustrated in FIGS. 1 through 4, the fishing aid device 10 generally comprises a housing 11; a fishing aid member 19 disposed in the housing; and an actuating assembly 15 disposed in the housing 11 for energizing the fishing aid member 19. The housing 11 has a main body 12 and a hollow tubular extension 13 having a distal opening 14 and extending from the main body 12.

The actuating assembly 15 includes an elongated conductor 16, a double layered capacitor 17 conventionally coupled to the elongated conductor 16 and capable of retaining a charge for a period of time, and a resistor 18 conventionally coupled to the elongated conductor 16 and in operable communication with the double layered capacitor 17. The elongated conductor 16 extends outwardly from the housing 11 and includes a battery engagement end and is capable of being in contact with a battery via battery engagement end 16a to charge the double layered capacitor 17 for a period of time.

The fishing aid member 19 includes a light-emitting member 20 conventionally connected to the double layered capacitor 17 and disposed in the housing 11 for emitting a light to illuminate bobbers 28 and fishing tackle 31. The light-emitting member 20 is disposed in the tubular extension 13 with light being emitted out of the distal opening 14 of the tubular extension 13. The housing further includes a hollow tube 21 conventionally disposed in the tubular extension 13 and having open ends 22, 23 and being adapted to receive a fishing line 29 therethrough with the light-emitting member 20 illuminating the fishing tackle 31 conventionally coupled to the fishing line 29. The actuating assembly 15 also includes a tilt switch 24 disposed in the housing 11 and conventionally connected to the double layered capacitor 17.

Also, the fishing aid member 19 includes a sound-producing member 32 disposed in the housing and conventionally connected to the tilt switch 24. Upon the tilt switch 24 being tilted, the sound-producing member 32 is energized by the double layered capacitor 17 and a sound is emitted. The light-emitting member 20 is conventionally connected to the tilt switch 24. Upon the tilt switch 24 being tilted the light-emitting member 20 is energized by the double layered capacitor 17 and light is emitted. The housing 11 includes a fastener 25 rotatably and conventionally mounted about the tubular extension 13 and being adapted to attach to the fishing pole 30. The fastener 25 includes a sleeve 26 conventionally disposed about the tubular extension 13 and also includes a C-shaped clip 27 conventionally attached to the sleeve 26 and extending therefrom and being adapted to clip about the fishing pole 30.

In use, the double layered capacitor 17 is charged for a period of time using a battery preferably a 9-volt battery. The positive pole of the battery is contacted to the elongated conductor 16 and simultaneously contacts a negative pole of the battery to the main body 12 for a period of time. The fishing aid member 19 is energized using the double layered capacitor 17 to assist in catching fish. The fishing aid member 19 includes the light-emitting member 20 which is supported by a fishing line 29 adjacent to the fishing tackle 31 which is illuminated by the light-emitting member 20. The light-emitting member 20 which is disposed inside a fishing bobber 28 with the elongated conductor 16 extended from the fishing bobber 28 with the fishing bobber 28 being illuminated by the light-emitting member 20. The fishing aid member 19 also includes a tilt switch 24 conventionally connected to the double layered capacitor 17 and to the fishing aid member 19 whereupon the fishing aid member 19 is energized upon the tilt switch 24 being tilted. The fishing aid member 19 includes a sound-producing member 32 which is energized and emits a sound upon the tilt switch 24 being tilted.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the fishing aid device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing aid device comprising:
   a housing having a main body and a hollow tubular extension having a distal opening and extending from the main body;
   a fishing aid member disposed in the housing;
   an actuating assembly disposed in the housing for energizing the fishing aid member, the actuating assembly including a single elongated conductor extending through the distal opening of the hollow tubular extension and outwardly from the housing, the elongated conductor simultaneously engageable with a positive pole of a 9-volt battery and a negative pole of the 9-volt battery to charge a double layered capacitor for a period of time, the double layered capacitor coupled to the elongated conductor and retaining an electrical charge for a period of time, and a resistor coupled to the elongated conductor and in communication with the double layered capacitor, and
   a light-emitting member connected to the double layered capacitor and disposed in the housing for emitting a light to illuminate bobbers and fishing tackle.

2. The fishing aid device as described in claim 1, wherein the light-emitting member is disposed in the tubular extension with light being emitted out of the distal opening of the tubular extension.

3. The fishing aid device as described in claim 1, wherein the housing further includes a hollow tube disposed in the tubular extension and having open ends and being adapted to receive a fishing line therethrough with the light-emitting member illuminating the fishing tackle coupled to the fishing line.

* * * * *